United States Patent Office.

HENRY FINK AND CATHARINE FINK, OF BALTIMORE, MARYLAND.

OIL FOR DRESSING LEATHER.

SPECIFICATION forming part of Letters Patent No. 243,876, dated July 5, 1881.

Application filed April 21, 1881. (No specimens.)

*To all whom it may concern:*

Be it known that we, HENRY FINK and CATHARINE FINK, of Baltimore, in the county of Baltimore, and in the State of Maryland, have invented certain new and useful Improvements in Oils for Dressing Leather; and we do hereby declare that the following is a full, clear, and exact description thereof.

This invention relates to an improved composition of matter for dressing leather, of which the following is a specification.

In carrying out our invention we take seven pounds of lime, one pound of pulverized soapstone, and five ounces of pulverized chalk. These we put into a barrel or other vessel of the capacity of forty-eight gallons, and pour upon the same a bucket of warm water, after which we stir and incorporate the whole well with a suitable paddle or other instrument until the ingredients are thoroughly commingled. We then fill the barrel or vessel with water, let it stand one day, and then mix the contents with the same quantity of oil, gallon for gallon, as required for use, care being taken not to employ or use the sediment deposited in the barrel or vessel.

Any kind of oil may be employed in connection with the other ingredients mentioned, but in practice cod-oil is found to be preferable.

The proportions given above are found to answer well for general purposes, but they may be varied to suit particular cases, and hence we do not intend to limit ourselves to the precise proportions named.

The above-named composition is used in the same manner as the ordinary compounds for similar purposes.

Having thus described our invention, what we claim, and desire to secure by Letters Patent, is—

The herein-described composition of matter consisting of lime, soapstone, chalk, water, and oil, combined substantially in the manner and proportions specified.

In testimony that we claim the foregoing we have hereunto set our hands this 7th day of December, 1880.

HENRY FINK.
CATHARINE FINK.

Witnesses:
GEO. J. KURTZ,
H. AUBREY TOULMIN.